US011586059B2

(12) United States Patent
Simard et al.

(10) Patent No.: US 11,586,059 B2
(45) Date of Patent: Feb. 21, 2023

(54) SILICON PHOTONICS MODULATOR USING TM MODE AND WITH A MODIFIED RIB GEOMETRY

(71) Applicant: Ciena Corporation, Hanover, MD (US)

(72) Inventors: Alexandre D. Simard, Québec (CA); Yves Painchaud, Québec (CA)

(73) Assignee: Ciena Corporation, Hanover, MD (US)

( * ) Notice: Subject to any disclaimer, the term of this patent is extended or adjusted under 35 U.S.C. 154(b) by 13 days.

(21) Appl. No.: 17/320,345

(22) Filed: May 14, 2021

(65) Prior Publication Data
US 2021/0271120 A1 Sep. 2, 2021

Related U.S. Application Data

(63) Continuation of application No. 16/554,736, filed on Aug. 29, 2019, now Pat. No. 11,022,825.

(60) Provisional application No. 62/726,408, filed on Sep. 3, 2018.

(51) Int. Cl.
G02F 1/025 (2006.01)
G02B 6/00 (2006.01)

(52) U.S. Cl.
CPC .......... G02F 1/025 (2013.01); G02F 2201/04 (2013.01); G02F 2201/063 (2013.01); G02F 2203/11 (2013.01)

(58) Field of Classification Search
CPC ....................................................... G02F 1/025
USPC ............................................................. 385/2
See application file for complete search history.

(56) References Cited

U.S. PATENT DOCUMENTS

| 4,961,619 A | * | 10/1990 | Hernandez-Gil .... G02B 6/2804 385/132 |
| 5,157,756 A | * | 10/1992 | Nishimoto ............. G02B 6/125 385/129 |
| 5,297,233 A | * | 3/1994 | Lerminiaux ......... G02B 6/2804 385/27 |
| 5,729,641 A | | 3/1998 | Chandonnet et al. |
| 5,894,535 A | * | 4/1999 | Lemoff ................ G02B 6/4246 385/47 |
| 5,903,689 A | | 5/1999 | Painchaud et al. |
| 5,911,018 A | * | 6/1999 | Bischel ................... G09F 9/305 385/11 |
| 6,061,487 A | * | 5/2000 | Toyama ................. G02B 6/125 385/47 |
| 6,915,047 B1 | * | 7/2005 | Mekis ...................... G02B 6/42 385/39 |

(Continued)

FOREIGN PATENT DOCUMENTS

| JP | 5413865 B1 * | 2/2014 | .......... G02B 6/1228 |
| WO | 2015127565 A1 | 9/2015 | |

(Continued)

Primary Examiner — Kaveh C Kianni
(74) Attorney, Agent, or Firm — Clements Bernard Baratta; Lawrence A. Baratta, Jr.; Christopher L. Bernard

(57) ABSTRACT

An optical modulator includes a rib; and a slab interconnected to both sides of the rib; wherein the rib is dimensioned relative to the slab to support guiding of a Transverse Magnetic (TM) mode with a main lobe that propagates orthogonal to the slab and with the main lobe substantially excluded from the slab. The rib guides wavelengths in an infrared range in the TM mode. A height of the rib, relative to the slab, is about half of a width of the rib, between the slab.

20 Claims, 10 Drawing Sheets

(56) References Cited

U.S. PATENT DOCUMENTS

| | | | | |
|---|---|---|---|---|
| 7,263,247 | B1* | 8/2007 | Hehlen | G02F 1/0955 385/24 |
| 7,603,016 | B1* | 10/2009 | Soref | B82Y 20/00 385/129 |
| 8,406,621 | B2 | 3/2013 | Painchaud et al. | |
| 8,411,260 | B1* | 4/2013 | Feng | G02B 6/132 356/73.1 |
| 8,842,946 | B1* | 9/2014 | Liao | G02B 6/136 385/14 |
| 8,948,549 | B2 | 2/2015 | Picard et al. | |
| 9,448,425 | B2* | 9/2016 | Ogawa | G02B 6/1228 |
| 9,541,775 | B2* | 1/2017 | Ayazi | G02F 1/2257 |
| 9,841,618 | B1 | 12/2017 | Poulin et al. | |
| 9,927,637 | B2* | 3/2018 | Ogawa | G02F 1/2257 |
| 9,941,973 | B2 | 4/2018 | Simard et al. | |
| 9,995,877 | B2* | 6/2018 | Nakamura | G02B 6/125 |
| 10,025,035 | B2 | 7/2018 | Painchaud et al. | |
| 10,027,420 | B2* | 7/2018 | Sahni | H04B 10/548 |
| 10,261,254 | B2* | 4/2019 | Shi | G02B 6/1228 |
| 10,444,593 | B2* | 10/2019 | Mekis | G02F 1/2257 |
| 10,502,895 | B2* | 12/2019 | Shi | G02B 6/1228 |
| 2004/0126052 | A1* | 7/2004 | Kamei | G02B 6/12028 385/39 |
| 2004/0151423 | A1* | 8/2004 | Izhaky | G02B 6/125 385/21 |
| 2004/0190830 | A1* | 9/2004 | Rasras | G02B 6/124 385/39 |
| 2006/0023989 | A1* | 2/2006 | Yanagisawa | G02B 6/29368 385/24 |
| 2006/0133716 | A1* | 6/2006 | Little | G02B 6/2804 385/14 |
| 2006/0251371 | A1* | 11/2006 | Schmidt | G01N 21/6454 385/129 |
| 2007/0092193 | A1* | 4/2007 | Yokino | G02B 6/12007 385/129 |
| 2007/0104422 | A1* | 5/2007 | Watanabe | G02B 6/125 385/39 |
| 2009/0142019 | A1* | 6/2009 | Popovic | G02B 6/1223 385/28 |
| 2010/0166363 | A1* | 7/2010 | Matsuoka | G02B 6/12002 385/14 |
| 2012/0087613 | A1* | 4/2012 | Rasras | G02F 1/2257 257/E31.124 |
| 2012/0243826 | A1* | 9/2012 | Sun | G02F 1/3138 385/17 |
| 2013/0195397 | A1* | 8/2013 | Kung | G02B 6/1223 438/57 |
| 2013/0195398 | A1* | 8/2013 | Liao | G02B 6/134 438/57 |
| 2013/0229701 | A1* | 9/2013 | Feng | G02F 1/0147 359/278 |
| 2013/0243374 | A1* | 9/2013 | Watanabe | G02B 6/2804 156/60 |
| 2013/0301979 | A1* | 11/2013 | Qian | H01L 31/105 257/E31.127 |
| 2013/0316484 | A1* | 11/2013 | Fong | G02F 1/025 438/57 |
| 2014/0113397 | A1* | 4/2014 | Qian | H01L 31/18 438/57 |
| 2014/0332918 | A1* | 11/2014 | Li | H01L 31/02327 257/432 |
| 2015/0123177 | A1* | 5/2015 | Xu | G02F 1/025 257/296 |
| 2015/0212268 | A1* | 7/2015 | Goodwill | G02B 6/3596 438/31 |
| 2015/0293384 | A1* | 10/2015 | Ogawa | G02F 1/2257 385/11 |
| 2015/0381283 | A1* | 12/2015 | Sahni | G02F 1/025 398/188 |
| 2016/0266337 | A1* | 9/2016 | Feng | G02B 6/4266 |
| 2017/0123239 | A1* | 5/2017 | Ayazi | G02F 1/025 |
| 2017/0212304 | A1* | 7/2017 | Sacher | G02B 6/12002 |
| 2017/0276872 | A1* | 9/2017 | Nakamura | G02B 6/125 |
| 2017/0299902 | A1* | 10/2017 | Yu | G02B 6/1228 |
| 2018/0045887 | A1* | 2/2018 | Shi | G02B 6/1228 |
| 2018/0059504 | A1* | 3/2018 | Mekis | G02F 1/2257 |
| 2018/0217469 | A1* | 8/2018 | Yu | G02F 1/2257 |
| 2018/0224605 | A1 | 8/2018 | Painchaud et al. | |
| 2018/0314083 | A1 | 11/2018 | Latrasse et al. | |
| 2019/0025508 | A1* | 1/2019 | Shi | G02B 6/1228 |
| 2019/0113822 | A1* | 4/2019 | Mekis | G02F 1/2257 |
| 2019/0113823 | A1* | 4/2019 | Mekis | G02F 1/025 |
| 2019/0179177 | A1* | 6/2019 | Rickman | H04B 10/299 |
| 2019/0271897 | A1* | 9/2019 | Iwatsuka | G02B 6/126 |
| 2019/0330482 | A1* | 10/2019 | Williams | C09D 11/00 |
| 2019/0331852 | A1* | 10/2019 | Uchida | G02B 6/125 |
| 2019/0331855 | A1* | 10/2019 | Lerose | G02F 1/025 |
| 2020/0012043 | A1* | 1/2020 | Abediasl | H01L 31/02327 |

FOREIGN PATENT DOCUMENTS

| | | | | |
|---|---|---|---|---|
| WO | WO-2015155900 | A1 * | 10/2015 | G02F 1/015 |
| WO | 2019148011 | A1 | 8/2019 | |

* cited by examiner (a)

(b)

(c)

SILICON PHOTONICS MODULATOR USING TM MODE AND WITH A MODIFIED RIB GEOMETRY

CROSS-REFERENCE TO RELATED APPLICATION

The present disclosure is a continuation of U.S. patent application Ser. No. 16/554,736, filed Aug. 29, 2019, and entitled "Silicon photonics modulator using TM mode and with a modified rib geometry," which claims priority to U.S. Provisional Patent Application No. 62/726,408, filed Sep. 3, 2018, and entitled "Silicon photonics modulators using TM," the contents of each are incorporated by reference herein in their entirety.

FIELD OF THE DISCLOSURE

The present disclosure generally relates to optical modulators. More particularly, the present disclosure relates to a silicon photonics modulator using the Transverse Magnetic (TM) mode and/or with a modified rib geometry.

BACKGROUND OF THE DISCLOSURE

As known in the art, SiP utilizes silicon as an optical medium with silicon patterned, with sub-µm precision, into photonic components. The operation is at wavelengths in the infrared range, usually around 1550 nm which is used by most optical communication systems. Silicon-based modulators are widely used in optical communication systems. It is well known in the art that silicon modulators can be based on the use of a PN junction in a rib waveguide. Such a waveguide is formed by providing a thick silicon waveguide core region (200 to 250 nm thick, for example) surrounded by a thin slab (around 100 nm thick, for example). The PN junction is typically formed laterally by doping one side of the waveguide with an N-type dopant, and the other side with a P-type dopant. The P and N regions are electrically connected on respective sides to electrodes.

In general, the design of a silicon-based modulator is a balancing of tradeoffs between phase efficiency, speed, and loss. A rib waveguide is a waveguide in which the guiding layer basically includes a slab with a strip (or several strips) superimposed onto it. Rib waveguides also provide confinement of the wave in two dimensions. Existing approaches for SiP modulators, including rib waveguides, do not meet the requirements for next-generation devices. For example, the requirements for next-generation devices include low Vπ, high bandwidth (BW), and low Optical Losses (OL). Vertical and U-shaped PN junctions, for example, have good Vπ but have very low modulation BW (typically below 15 GHz). Also, the access resistance of such a structure is too high. Typically, most known solutions improve one figure-of-merit of the modulator (low Vπ, high bandwidth (BW), or low Optical Losses (OL)) at the expense of the others.

BRIEF SUMMARY OF THE DISCLOSURE

In an embodiment, a silicon photonics modulator includes a rib that is a PN junction; a slab including a P doped region adjacent to the waveguide core on a first side and an N doped region adjacent to the waveguide core on a second side, opposite the first side; and a first electrode connected to the P-doped region and a second electrode connected to the N-doped region, wherein the rib is dimensioned to support guiding of a Transverse Magnetic (TM) mode with a main lobe that propagates orthogonal to the slab. The rib can guide wavelengths in an infrared range in the TM mode. A thickness of the rib can be about half of a width of the rib. A thickness of the rib can be about 400 nm, and a width of the rib can be about 200 nm. A thickness of the rib can be about four times a thickness of the slab. The P-dopant level and the N-dopant level can be each varied in the slab between the rib and the corresponding electrodes. For the silicon photonics modulator, modulator Vπ can be about 2 V, optical losses can be about 4 dB, and bandwidth can be around 26 GHz. A gap can be included in a middle of the slab where the rib is located, to shift an optical mode away from the slab. Another slab can be included on top of the waveguide to provide a tilted-H waveguide.

In another embodiment, a silicon photonics modulator includes a first region of a waveguide defined by a depletion width of a PN junction; a second region of the waveguide defined by a remaining portion of the waveguide from the first region; a third region that is a slab area surrounding the waveguide and that includes a P-dopant on a first side adjacent the waveguide and an N-dopant on a second side adjacent the waveguide opposite the first side; and a fourth region surrounding the waveguide, wherein the first region has a width similar to a width of the waveguide, supporting a Transverse Magnetic (TM) mode with a main lobe that propagates orthogonal to the slab. The waveguide can guide wavelengths in an infrared range in the TM mode. A thickness of the waveguide can be about half of a width of the waveguide. A thickness of the waveguide can be about 400 nm, and a width of the waveguide can be about 200 nm. A thickness of the waveguide can be about four times a thickness of the slab. The silicon photonics modulator can further include two electrodes each disposed on opposite sides of the third region. The P-dopant level and the N-dopant level can be each varied in the slab between the waveguide and the corresponding electrodes. For the silicon photonics modulator, modulator Vπ can be about 2 V, optical losses can be about 4 dB, and bandwidth can be around 26 GHz. A gap can be included in a middle of the slab where the rib is located, to shift an optical mode away from the slab. Another slab can be included on top of the waveguide to provide a tilted-H waveguide.

In a further embodiment, a method for providing a silicon photonics modulator includes providing a rib that is a PN junction; providing a slab including a P doped region adjacent to the waveguide core on a first side and an N doped region adjacent to the waveguide core on a second side, opposite the first side; and providing a first electrode connected to the P-doped region and a second electrode connected to the N-doped region, wherein the rib is dimensioned to support guiding of a Transverse Magnetic (TM) mode with a main lobe that propagates orthogonal to the slab.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1(*c*) is a diagram illustrating the various sections of the phase shifters. The optical waveguide has a thickness of 220 nm, a width of 500 nm and the slab thickness is 90 nm.

DETAILED DESCRIPTION OF THE DISCLOSURE

Figures 1A, 1B, 1C:
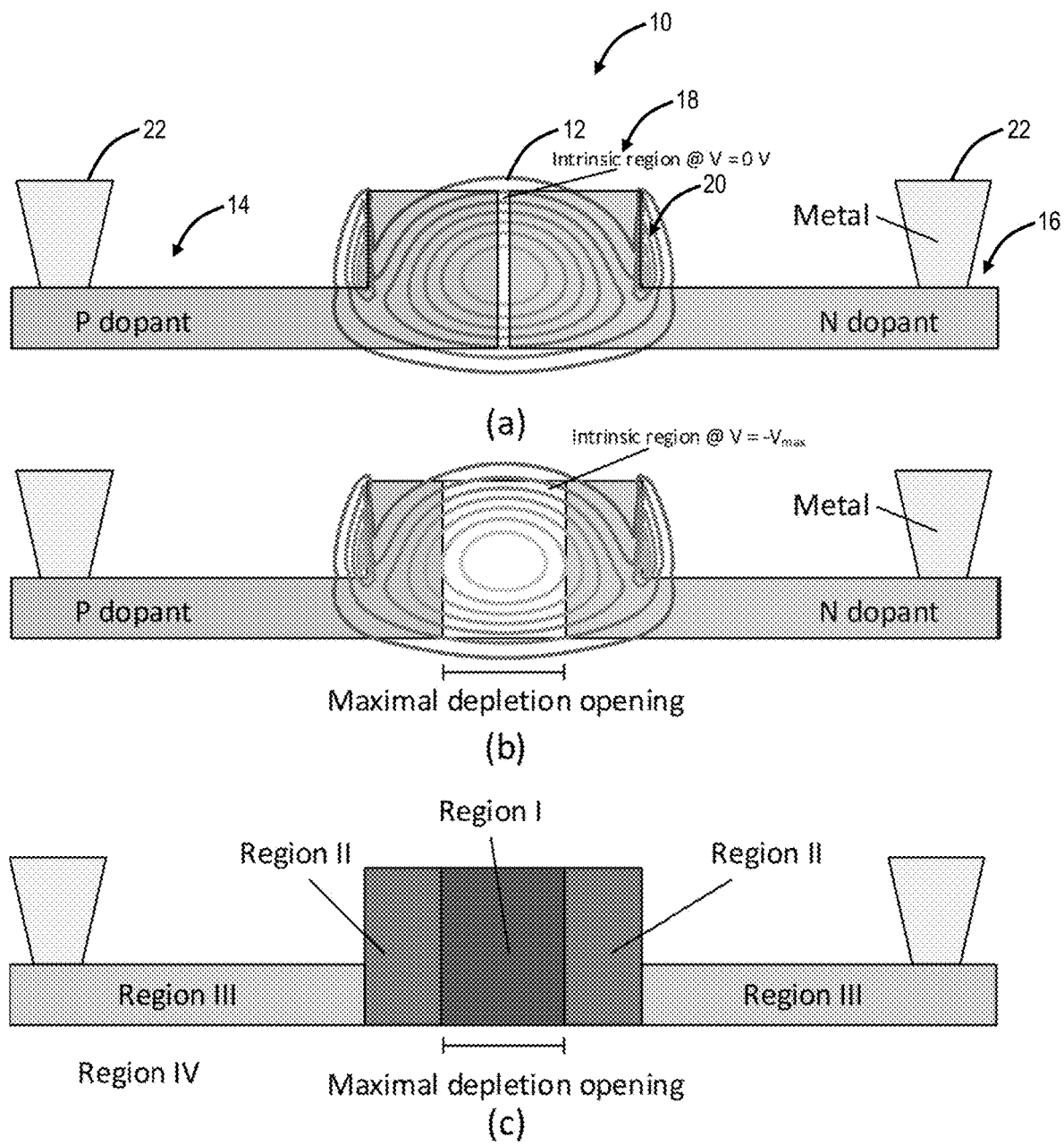
FIGS. 1(*a*) and 1(*b*) are diagrams of a lateral PN junction based modulator with an applied reverse bias of a) 0 V and b) $V_{max}$.
FIG. 1(d) is a Poynting-vector mode profile for the lateral PN junction based modulator of FIGS. 1(a)-1(c).

Typical silicon photonics (SiP) modulators are based on the use of PN junctions in an optical waveguide. The waveguide is usually formed with a thicker silicon layer (typically 220 nm) surrounded by a thinner slab section (typically thinner than 100 nm) as shown in a lateral PN junction based modulator 10 in FIGS. 1(a) and 1(b). The shape of the first TE mode of the structure is also illustrated (lines 12). Most modulators 10 have a p-type dopant 14 on one side and an n-type dopant 16 on the other side which creates a vertical intrinsic region 18. These structures are called lateral PN junctions 20. The PN junctions 20 are connected to two (metal) electrodes 22 positioned on each side of the waveguide. The electrodes 22 are usually far to prevent excessive optical losses. When a reverse bias is applied to the electrodes 22, the depletion width of the PN junction 20 increases, which changes the effective index of the mode, as illustrated in the difference between FIGS. 1(a) and 1(b).

To simplify the following discussion, the optical modulator is split into four regions I, II, III, IV as shown in FIG. 1(c). Region I is defined by the depletion width of the PN junction 20 biased at the maximum reverse bias voltage ($V_{max}$) allowed by the driver, applied to the electrodes 22. The efficiency of the PN junction 20 (i.e., the $V_\pi L_\pi$) is solely defined by the characteristics of this section (dopant concentration, mode profile, etc.). Region II is the remaining section of the un-etched optical waveguide. In this section, the optical intensity of the mode is typically still very high. Region III is a third section which is the thin slab area surrounding the optical waveguide. This section connects the PN junction 20 to external circuits via the electrodes. The optical mode in this area is typically exponentially decaying. The combination of region II and III dominates the optical loss of the modulator 10 as well as the access resistance of the junction 20. From now on, these two sections are called an "access region." Region IV is the $SiO_2$ surrounding the optical waveguide. The PN junction 20 does not affect this portion of the optical signal.

Silicon modulators need to be designed carefully to optimize the various trade-offs of the structure. The doping concentration close to the peak of the optical mode (Region I) should be as high as possible to improve the modulator efficiency and reduce its V. However, too high doping concentrations create modulators with a large junction capacitance, which leads to a lower modulation bandwidth. The access region (Region II and III) should have a doping concentration as low as possible to minimize optical losses but, at the same time, should have a doping concentration as high as possible to minimize the access resistance hence improving the modulator bandwidth. A proper trade-off needs to be made depending on the application.

The typical dimensions of the modulator 10, 500 nm×220 nm with a 90 nm rib, only guide the TE modes. Note, the first TE mode is guided, and at least the second TE mode is guided as well. Both the size and the wavelength have an impact on the guided mode of the structure. The index of refraction of the material is also critical to determine the guided mode. An optical mode is completely defined by its mode profile and the effective index.

Note, the various dimensions described herein are presented as approximate values and variations are expected due to manufacturing tolerances, etc. Also, various descriptions with reference to the modulator 10, such as the Regions I, II, III, and IV, apply equally to the silicon photonics modulator 30.

In various embodiments, the present disclosure relates to a silicon photonics modulator using the Transverse Magnetic (TM) mode. The present disclosure proposes a different geometry, namely 200 nm×400 nm with a 90 nm rib to enable the use of the TM modes. The silicon photonics modulator improves operation using the first TM mode instead of the usual Transverse Electric (TE) mode. Most SiP modulators are fabricated on a 220 nm thin-film silicon layer. In this type of rib waveguides, TM modes are not supported, which is why the TM mode is not used. Here, it is proposed to fabricate the modulator on a thicker silicon thin-film that allows the TM mode to be guided. The TM mode does not have significant optical intensity where there is a need to have a large density of carrier, namely Region II and III). As a result, the access resistance of the PN junction can be reduced considerably providing a low $V\pi$ modulator combined with a high bandwidth response. This silicon photonics modulator is critical to meet the requirements for the transmitter of a High-Bandwidth Coherent Optical Subassembly (HB-COSA). For example, this silicon photonics modulator can be used in different form factors including CFP2-DCO, QSFP-DD, OSFP, etc. as well as vendor-specific modules.

In addition to presenting a silicon photonics modulator using the TM mode, the present disclosure includes new waveguide structures shown to improve the mode confinement in the desired region. Specifically, by adding either a gap in the slab of a rib waveguide or a second slab, the mode is more confined in the core and less in the slab. This modified rib geometry may be used with the silicon photonics modulator using the TM mode as well as other silicon photonics modulators such as using the TE mode.

For the next SiP modulator generation, there is a need to have a modulator with low $V_\pi$, high bandwidth (BW) and low optical losses (OL). More exotic PN junctions then the usual lateral PN junction have been considered. Vertical PN junctions (the depletion region is horizontal) and U-shaped PN junctions are well known in the literature. These high-efficiency PN junctions provide modulators with very low V. Unfortunately, the capacitance of such a structure is too high, and the access resistance cannot be reduced enough. As a result, such PN junctions typically results in modulation BW lower than 15 GHz. If the BW needs to be increased, usually, the modulator length or the access resistance of the modulator is reduced. Unfortunately, these schemes result either in a degradation of the % and the OL figure-of-merits. To conclude, most known solutions improve one figure-of-merit of the modulator at the expense of the others.

This silicon photonics modulators described herein are critical to meet the requirement for the transmitter of the high-bandwidth COSA (HB-COSA). These applications need different form factors: CFP2-DCO, QSFP-DD, or OSFP for pluggable or, if not pluggable, then the HB-COSA will sit inside a module.

As for today, the modulator requirements of the HB-COSA are as below:

1) The Vπ should be around 2.5 V (or lower);
2) The optical losses of the modulator should be around 5.7 dB (or lower); and
3) The modulation EO bandwidth should be 25-30 GHz (or higher).

For the baseline modulator available now, the Vπ is 3.5 V, the optical losses are 5.7 dB, and the EO bandwidth is 20 GHz. This is far from the specification for the HB-COSA. Starting from this baseline modulator, the first step that needs to be achieved is the reduction of the modulator Vπ to a value lower than 2.5 V since this specification is important. One possible way to achieve this goal is to increase the modulator length. Unfortunately, this will necessarily reduce the modulator BW to a value most likely close to 15 GHz. Afterward, the BW needs to be improved by reducing the access resistance of the modulator. A BW improvement of about 5 GHz can be obtained without additional optical losses. However, the last 5 to 10 GHz will severely increase the optical losses. The target specifications could then be obtained only by using an external amplifier.

SiP Modulator Utilizing the TM Mode

The silicon photonics modulator proposed herein provides an improvement through a better designed optical waveguide. Ideally, one should maximize the optical intensity located in Region I. In this situation, the phase shifts per unit of capacitance will be maximized as well. Furthermore, Region II and III should contain as little optical power as possible. This will result in reducing the access resistance without increasing the optical losses. These two points maximize the modulator bandwidth.

To achieve this, it is proposed to use the TM mode of a rib waveguide instead of the usual TE mode. As mentioned before, most SiP modulators are fabricated on a 220 nm thin-film silicon layer and the slab area is typically smaller than 100 nm. In this type of waveguide, TM modes are not supported.

For conventional strip waveguides, both the TE and TM modes are guided. However, strip waveguides are not useful for optical modulators because there are no contacts to control them electrically. As a result, rib waveguides, such as in FIGS. 1(a)-1(c), are used. If the rib is too thick compared to the core waveguide (~220 nm), the TM mode stops being guided. This is the case for the usual rib thickness (~90 nm) used.

Figure 1D:
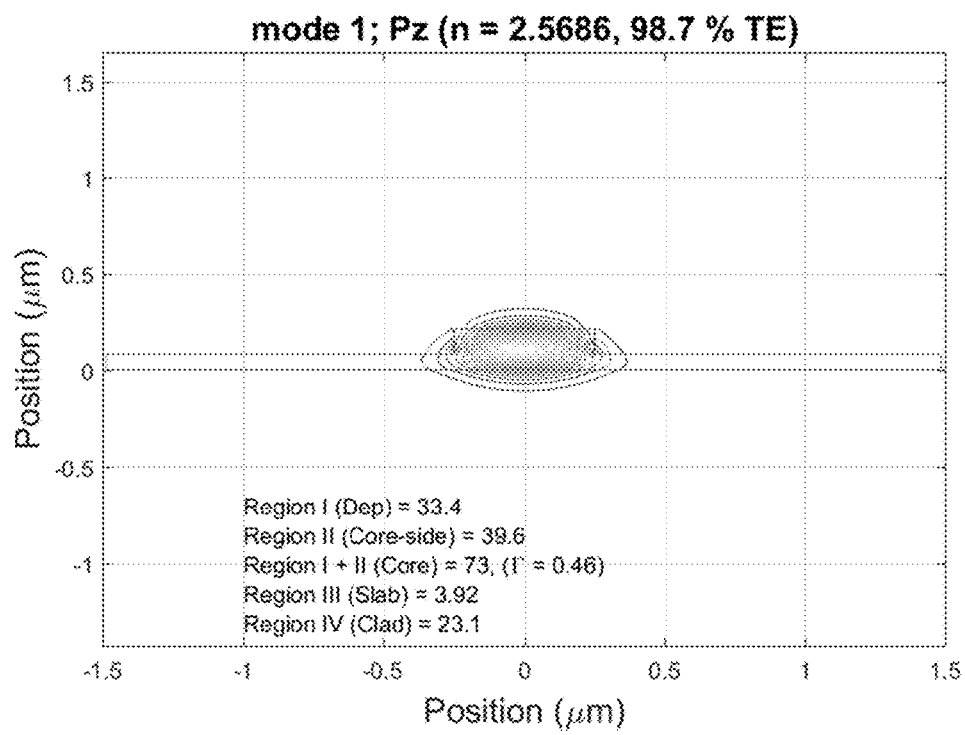
Figure 2D:
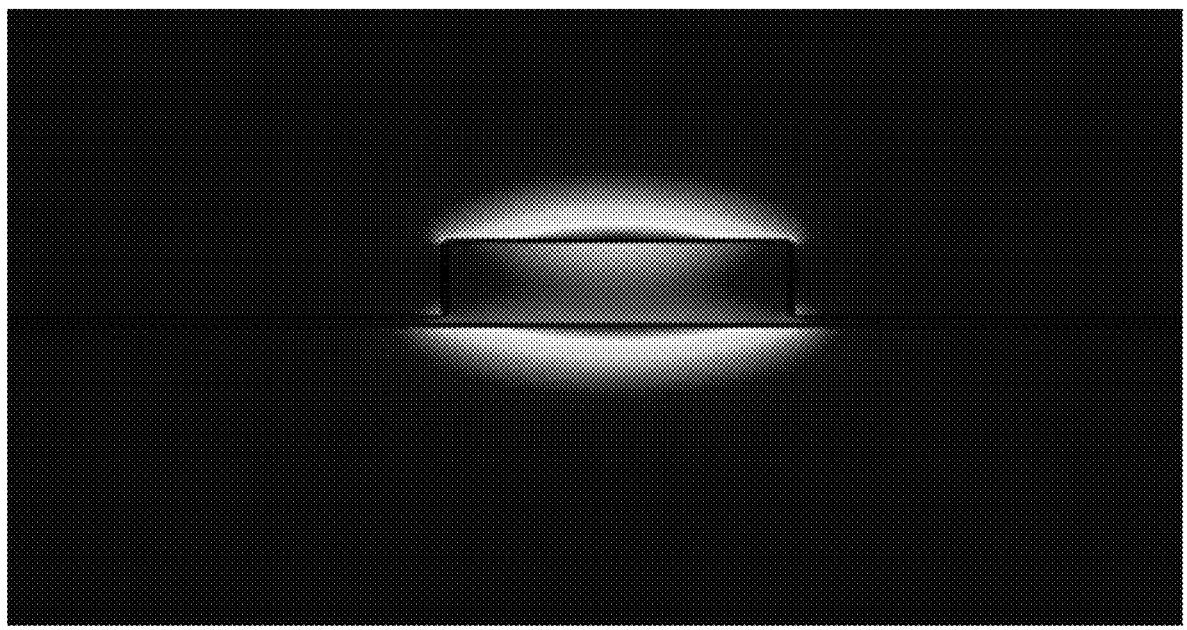
FIG. 2(d) is a Poynting-vector mode profile for the lateral PN junction based modulator of FIGS. 2(a)-2(c).

To allow the TM mode to be guided, the present disclosures increase the waveguide thickness (~400 nm) enough so that the TM mode is guided while using the usual rib thickness (~90 nm). One could propose to keep the usual waveguide thickness constant (~220 nm) and reduce the rib thickness instead (<<~90 nm). This does work as well, and the TM mode is guided. This idea has the benefit of being directly compatible with the usual platform. However, most of the optical intensity is in the cladding (see FIG. 1(d)), which would make the modulator very inefficient. This may be useful in some situations such as sensors, but likely not for modulators. Of note, FIG. 2(d) illustrates the optical intensity for the silicon photonics modulator 30 proposed herein.

Figure 2A:
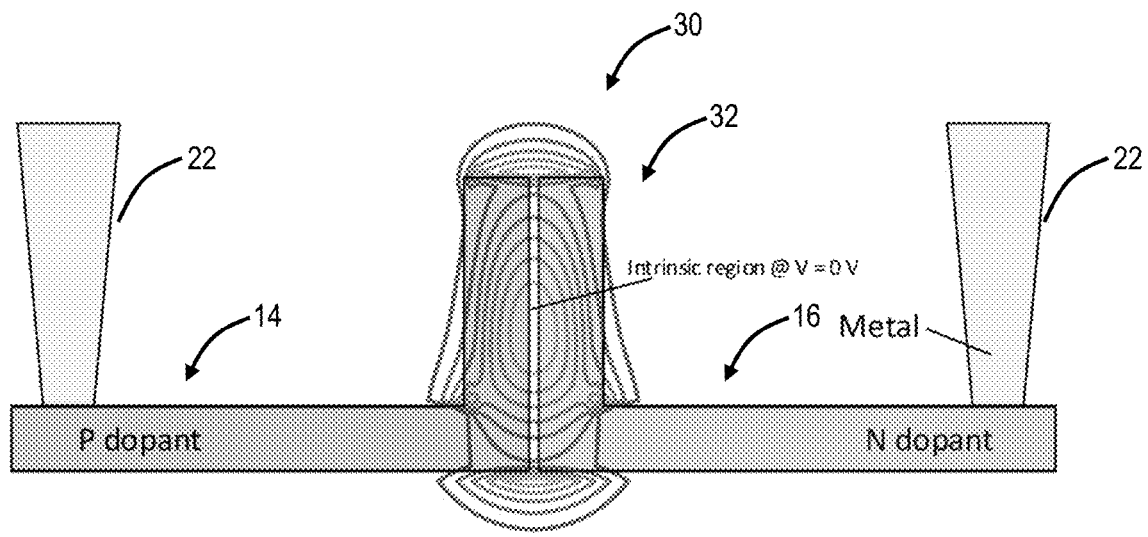
FIGS. 2(a) and 2(b) are diagrams of a lateral PN junction based modulator with an applied reverse bias of a) 0 V and b) $V_{max}$.
Figure 2B:
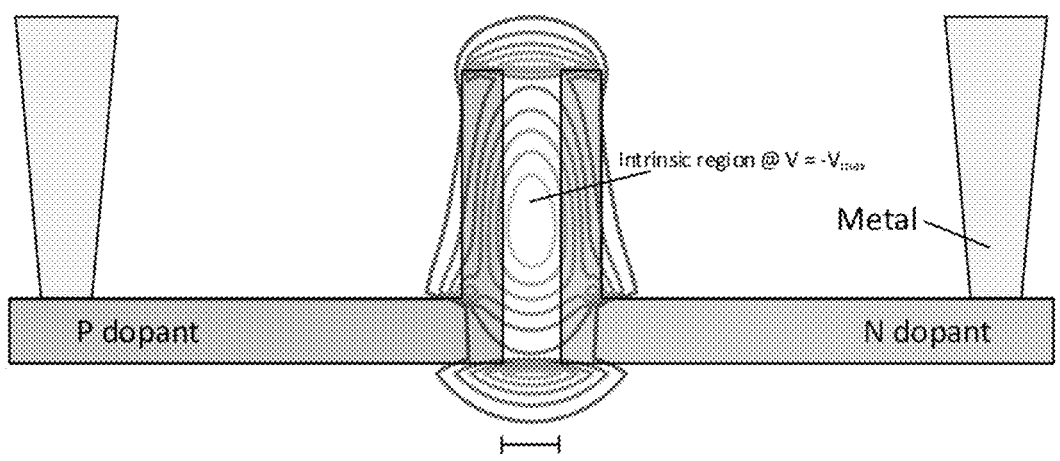
Figure 2C:
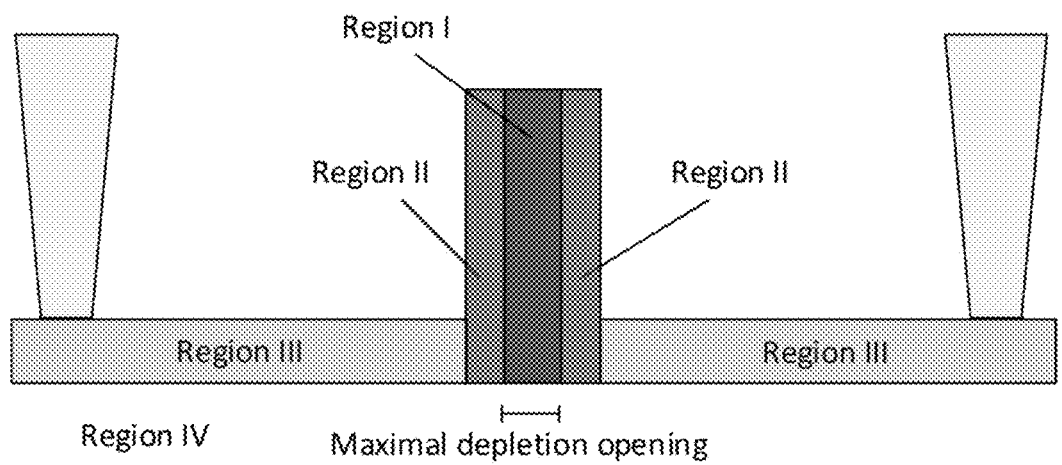
FIG. 2(c) illustrates the various sections of the phase shifters. The optical waveguide has a thickness of 400 nm, a width of 200 nm and the slab thickness is 90 nm, enabling use of the TM mode.

FIGS. 2(a)-2(c) illustrate an implementation of the silicon photonics modulator 30 proposed herein such as using a 400 nm thick silicon waveguide. The width is 200 nm, and the slab thickness is still 90 nm. Here, the charge concentration in the P and N region with the P dopant 14 and the N dopant 26, respectively, is assumed to be the same as those in FIG. 1. Since the depletion width of a PN junction (rib) 32 depends on the doping concentration, if the concentration of both the P dopant 14 and the N dopant 16 are the same, the Region I width of both FIG. 1 and FIG. 2 are going to be the same. FIG. 2 illustrates a lateral PN junction 32. However, the idea can be implemented using any kind of PN junctions.

The two optical waveguides in FIG. 1 and FIG. 2 have a similar rectangular dimension but the silicon photonics modulator 30 is rotated by 90° relative to the modulator 10. That is, FIG. 2 is rotated 90° relative to the FIG. 1, while both are shown in a similar orientation. For example, the modulator 10 in FIG. 1 can have a thickness of 220 nm, a width of 500 nm and the slab thickness is 90 nm, and the modulator 30 in FIG. 2 can have a thickness of 400 nm, a width of 200 nm and the slab thickness is 90 nm.

Figure 4:
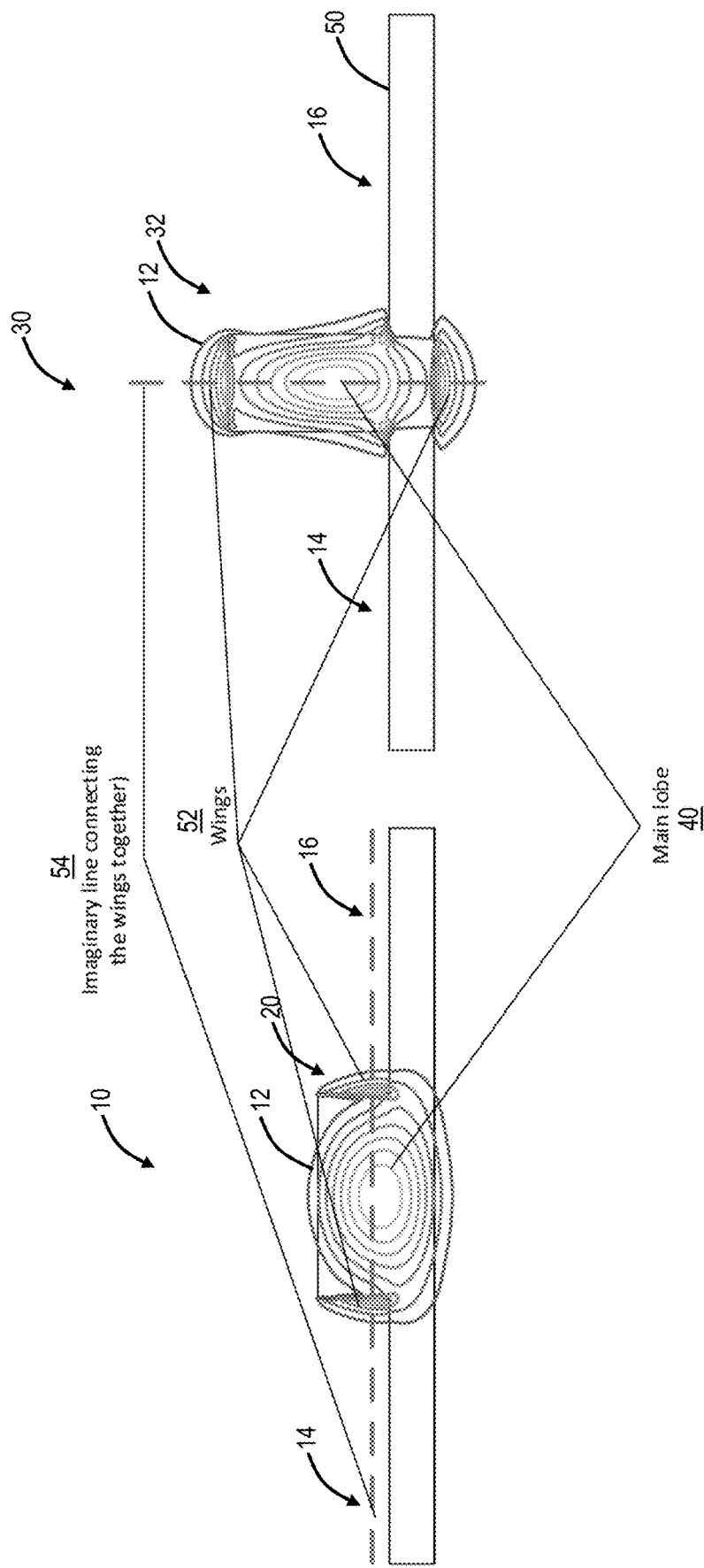
FIG. 4 is a diagram comparing the modulator of FIG. 1 that only guides TE modes with the modulator of FIG. 2 that guides the TM mode.

The modulator 10 has a wide but thin waveguide (as shown in FIGS. 1(a)-1(c)), while the silicon photonics modulator 30 has a narrow but high waveguide (as shown in FIGS. 2(a)-2(c)) resulting in an optical mode more suited for optical modulators (a rotation of 90 degree of the aspect ratio of the waveguide). FIG. 4 is a diagram comparing the modulator 10 of FIG. 1 that only guides TE modes with the modulator 30 of FIG. 2 that guides the TM mode. In FIG. 4, it is shown that both modulators 10, 30 has similar main lobes 40 except that the modulator 30 has its main lobe 40 rotated by 90 degrees relative to the modulator 10. That is, the modulator 10's main lobe 40 is parallel to the slab, whereas the modulator 30's main lobe 40 is approximately perpendicular (orthogonal) to the slab.

In FIG. 4, the modulator 30 has similar main lobes 40 as the modulator 10 except that the TM mode is rotated by 90 degrees. That is, the main lobes of the modulator 30 are perpendicular to a slab 50. Wings 52 of the modulator 30 are similar to the wings 52 of the modulator 10, again except rotated by 90 degrees.

For the modulator 10, it is very confined vertically but not so confined horizontally. The situation is reversed for the TM mode in the modulator 30. An imaginary line 54 shows the direction where the mode is less confined. Of course, the presence of the slab 50 modifies the mode profile a bit, but the idea was to change the relative position of the slab 50 compared to the lines 54. In the modulator 10, the line 54 is colinear with the slab 50 which makes the mode confinement inside the slab 50 not as good compared to the TM mode in the modulator 30 one where the line 54 is orthogonal to the slab 50. Thus, the optical mode in the modulator 30 does not naturally penetrate in the slab 50, unlike in the modulator 10.

This has a few significant benefits:

1) The optical mode is laterally more confined in Region I, which will improve the modulator Vπ in the modulator 30 compared to the modulator 10.

2) Since Region I has a width similar to the waveguide width, Region II becomes very narrow in the modulator 30. The fraction of optical power located in this section being smaller, the optical losses will be smaller as well in the modulator 30 compared to the modulator 10.

Because of the boundary conditions of the electromagnetic fields, the mode does not enter significantly into Region III in the modulator 30. As a result, larger charge concentrations can be brought closer to the optical waveguide hence reducing the access resistance without increasing the propagation losses. This will improve the modulator BW.

Table 1 below shows the fraction of the optical mode in the various regions of the waveguides shown in FIGS. 1 and 2. The TM mode contains about 50% more optical intensity than the TE mode in Region I. Furthermore, and more importantly, the optical power located in Region II is reduced by more than 50%. This results in a significant reduction of the optical losses. Finally, the amount of optical power in Region III is also a bit less than two times lower for the TM mode compared to the TE mode. As a result, the access resistance will be reduced significantly without modifying the overall optical losses.

One can also notice that there is a larger amount of optical mode in the cladding area for the TM mode compared to the TE mode. In principle, it is better to have a large portion of the mode intensity in Region I. However, it is also necessary to have as less optical intensity in Region II and III as possible. As a result, if the optical intensity cannot be confined inside Region I, it is better to have it in Region IV (instead of Region II and III) to prevent the addition of excess losses.

TABLE 1

The fraction of the Poynting-vector profile for the waveguides shown in FIGS. 1 and 2

| Polarization | Waveguide width (nm) | Waveguide height (nm) | Slab height (nm) | Portion of the optical mode in Region I to IV | | | |
|---|---|---|---|---|---|---|---|
| | | | | I | II | III | IV |
| TE | 500 | 220 | 90 | 0.33 | 0.39 | 0.038 | 0.241 |
| TM | 200 | 400 | 90 | 0.55 | 0.13 | 0.0240.03 | 0.30 |

Implementing this silicon photonics modulator requires a silicon layer thicker than the usual 220 nm thin film. To get this thicker silicon layer (300 nm, 400 nm, etc.), there are two possibilities. The first approach is to start with an initial wafer having the right thickness. However, components already designed for 220 nm Si film will either have to be redesigned or, alternatively, the process could be modified such that an extra etching step would be added to bring some areas of the wafer to the desired 220 nm thick silicon film. The biggest challenge with this approach is to obtain blank Silicon on Insulator (SOI) wafers having the proper characteristics (silicon film thickness, silicon resistivity, BOX thickness, etc.). The second approach could be to locally grow poly-silicon or monocrystal silicon above the thin 220 nm film that will be used for the modulator 30. As a result, the modulator 30 will have a thicker structure while leaving the rest of the wafer unchanged.

The silicon photonics modulator 30 presented above can reach the required specifications. To illustrate the gain obtained from this silicon photonics modulator 30, the performances of the modulator 30 shown in FIG. 3 has been simulated using the same simulation tools as for the baseline modulator. The modulator Vπ is 2 V, the optical losses are 4 dB, and the expected bandwidth is around 26 GHz. The modulator 30 can further be optimized using the approaches described in PCT Patent Application No. PCT/US2019/015258, filed Jan. 25, 2019, and entitled "Silicon-based modulator with optimized doping profiles and different transition zone thicknesses," the contents of which are incorporated herein by reference. As a result, using the TM mode is a good path to quickly reach the SiP modulator figure-of-merit required for the next product generation.

In an embodiment, the silicon photonics modulator 30 includes a rib 32 that is a PN junction; a slab 50 including a P doped region adjacent to the waveguide core on a first side and an N doped region adjacent to the waveguide core on a second side, opposite the first side; and a first electrode 22 connected to the P-doped region and a second electrode 22 connected to the N-doped region, wherein the rib is dimensioned to support guiding of a Transverse Magnetic (TM) mode with a main lobe 40 that propagates orthogonal to the slab 50.

The rib 32 guides wavelengths in an infrared range in the TM mode. For example, the wavelengths can be in the 1500 nm-1650 nm range. In an embodiment, the wavelengths can be in the 1525 nm-1565 nm range to cover the C-band in fiber optic communication systems. A thickness of the rib 32 can be about half of a width of the rib 32, where the thickness is how much the rib 32 extends out from the slab 50. A thickness of the rib 32 can be about 400 nm, and a width of the rib 32 can be about 200 nm. A thickness of the rib 32 can be about four times a thickness of the slab 50.

The P-dopant level and the N-dopant level can be each varied in the slab between the rib and the corresponding electrodes. For the silicon photonics modulator, modulator Vπ can be about 2 V, optical losses can be about 4 dB, and bandwidth can be around 26 GHz. A gap 72 can be included in a middle of the slab 50 where the rib 32 is located, to shift an optical mode away from the slab 50. Also, another slab can be included on top of the waveguide to provide a tilted-H waveguide.

In another embodiment, a first region of a waveguide defined by a depletion width of a PN junction; a second region of the waveguide defined by a remaining portion of the waveguide from the first region; a third region that is a slab area surrounding the waveguide and that includes a P-dopant on a first side adjacent the waveguide and an N-dopant on a second side adjacent the waveguide opposite the first side; and a fourth region surrounding the waveguide, wherein the first region has a width similar to a width of the waveguide, supporting a Transverse Magnetic (TM) mode with a main lobe that propagates orthogonal to the slab.

SiP Modulator with a Modified Rib Geometry

Figure 5A:
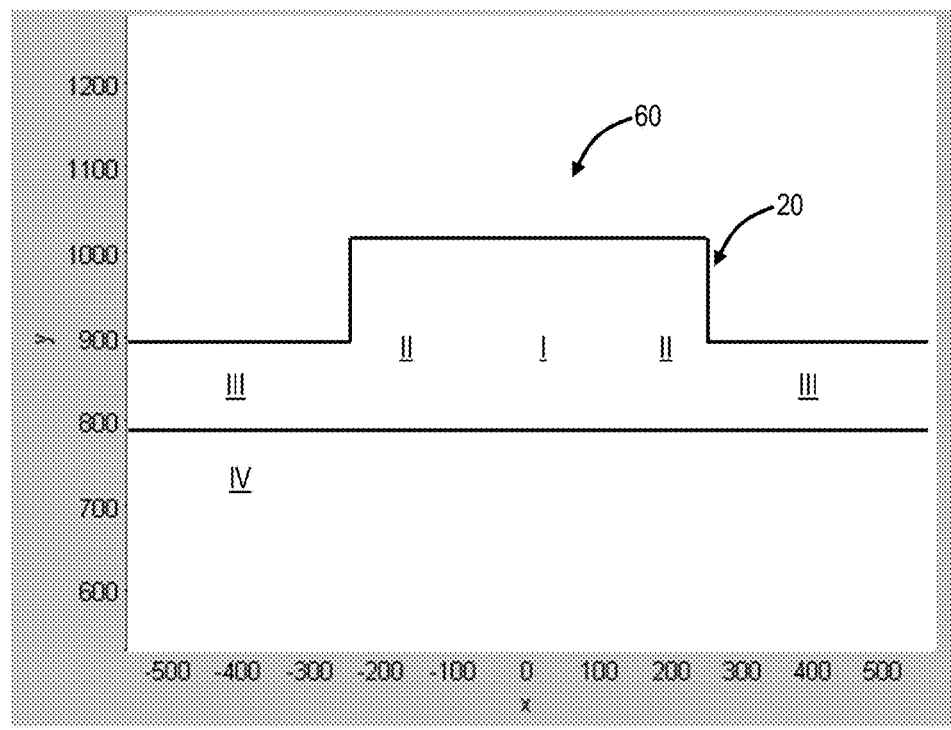
FIG. 5(a) is a waveguide shape and FIG. 5(b) is a Poynting-vector mode profile for a typical rib waveguide used for making an optical modulator.
Figure 5B:
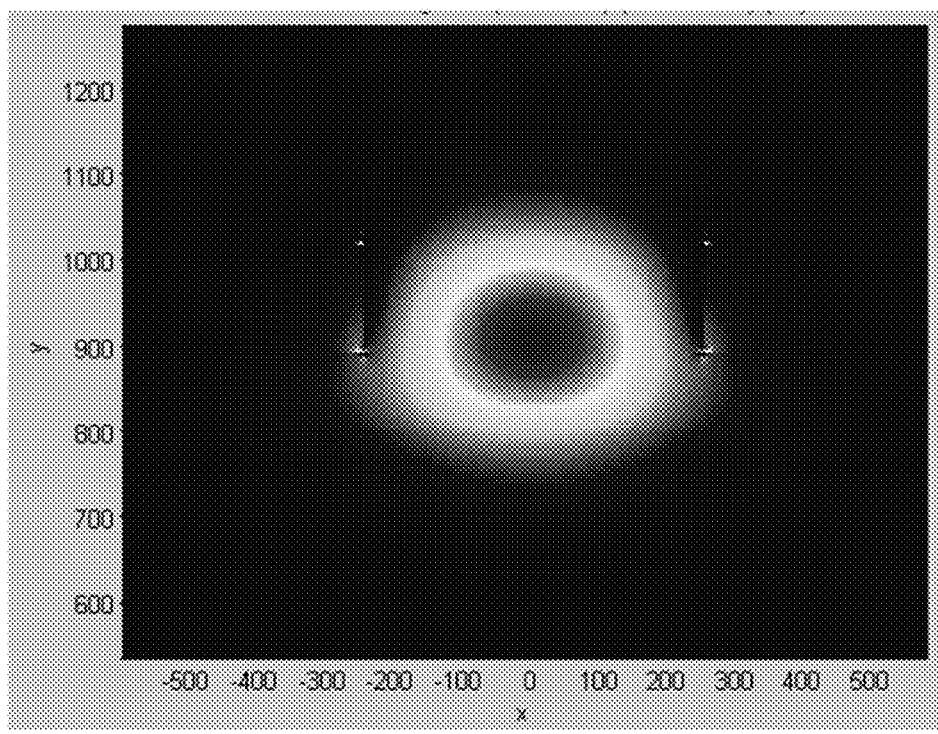

The doping concentration of the P-dopant 14 and the N-dopant 16 needs to be high in region III in order to decrease the access resistance and obtain a fast modulation. However, the presence of a fraction of the optical mode in this region causes optical loss. FIG. 5(a) is a waveguide shape 60 and FIG. 5(b) is a Poynting-vector mode profile for a typical rib waveguide used for making an optical modulator.

As seen in the first line of Table 1, although containing only 3.8%, the region III significantly contributes to the modulator optical loss since a large amount of dopant in that region is required to provide fast optical modulation.

In the present disclosure, it is proposed to modify the rib geometry in regions I and II to decrease the fraction of the optical mode in region III allowing for decreasing the optical loss while keeping substantially the same modulation efficiency and speed.

Rib-Gap

Figure 6A:
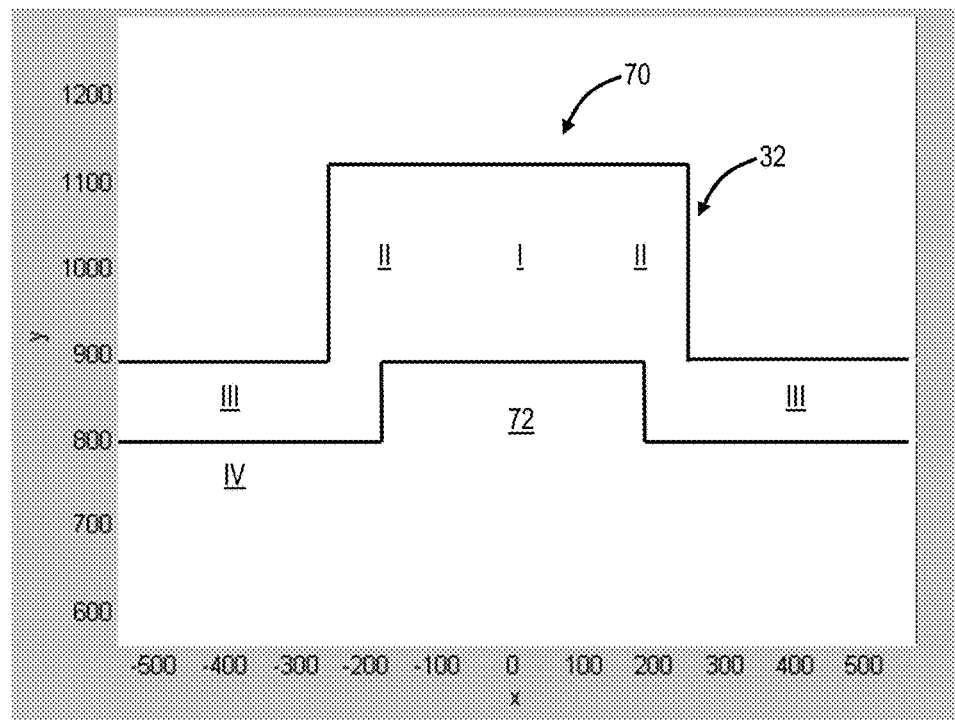
FIG. 6(a) is a waveguide shape and FIG. 6(b) is a Poynting-vector mode profile for a modified rib waveguide 70 according to the present disclosure.
Figure 6B:
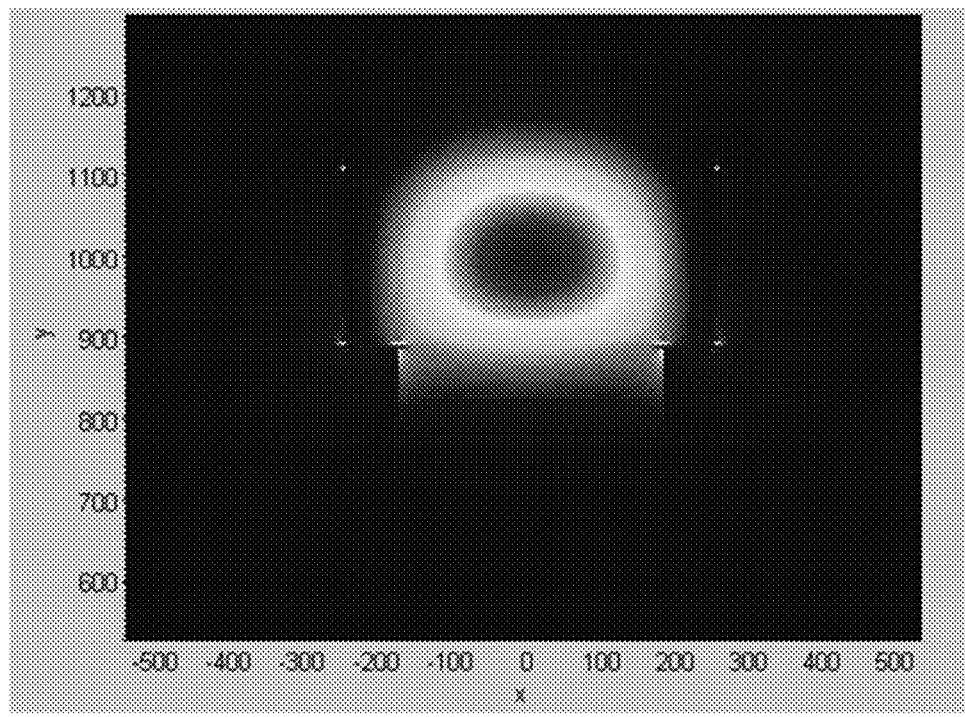

FIG. 6(a) is a waveguide shape 70 and FIG. 6(b) is a Poynting-vector mode profile for a modified rib waveguide 70 according to the present disclosure.

The modified rib waveguide 70 includes a gap 72 introduced in the middle of the slab (extending region IV) that causes the optical mode to be shifted higher in the core (regions I and II) with a decreased fraction in the slab. In order to maintain similar mode confinement, the height of the waveguide at the center is increased to correspond to the overall height of the previous rib waveguide.

TABLE 2

Figure 3:
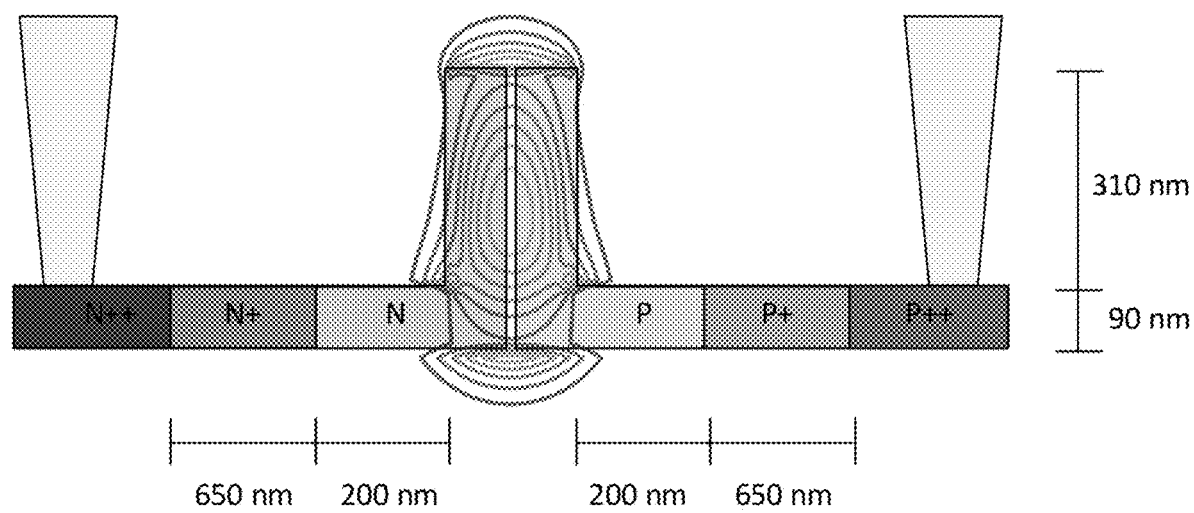
FIG. 3 is a diagram of the geometry of a TM-mode based silicon photonics modulator.

The fraction of the Poynting-vector profile shown in FIG. 3 contained in the four regions illustrated in FIG. 1c.

| Polarization | Waveguide width (nm) | Waveguide central height (nm) | Slab height (nm) | Portion of the optical mode in section I to IV | | | |
|---|---|---|---|---|---|---|---|
| | | | | I | II | III | IV |
| TE | 500 | 220 | 90 | 0.349 | 0.384 | 0.019 | 0.248 |

One sees that this new geometry allows decreasing by about a factor of two the modal fraction in region III. A significant decrease of the modulator optical loss is expected accordingly while the access resistance remains virtually unchanged.

Figure 7:
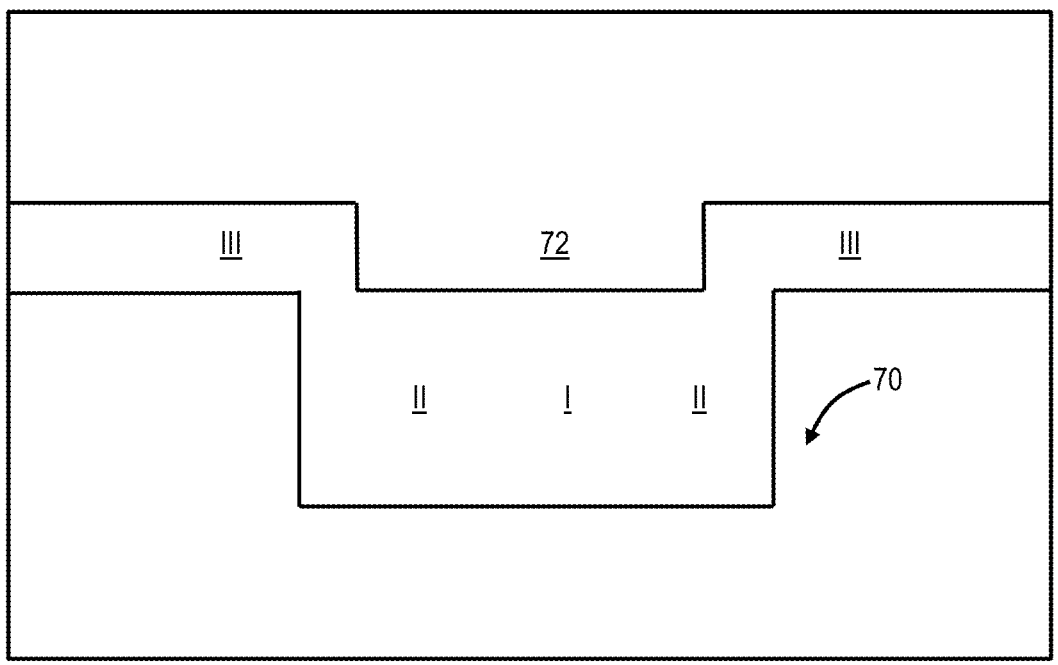
FIG. 7 is an upside-down waveguide profile according to the present disclosure.

To fabricate such a new configuration, it might be easier to build the structure upside down, as shown in FIG. 7. Noteworthy, a silicon layer could be deposited over an already patterned and flatten structure composed of a silicon waveguide surrounded by silica. Then the new layer can be patterned as well to introduce the desired gap as shown in FIG. 7.

Flipping the structure as shown in FIG. 7 could also ease the definition of side contact having a thinner thickness. Indeed, considering the rib waveguide shown in FIG. 4, it is difficult to define a slab waveguide on each side of the core having a desired very thin thickness since the accuracy is most often corresponding to a fraction of the etched material. The etching accuracy is typically about +/−10%. Thus, defining a 50 nm slab starting from an initial thickness of 220 nm means that 170 nm of silicon needs to be etched. Assuming a +/−10% accuracy in the etching depth, the resulting thickness would be 50+/−17 nm corresponding to +/−34%.

Using rather the structure shown in FIG. 7, a thin slab could be defined with an improved accuracy.

The silicon layer deposited on top of an already patterned structure can be of different nature. It can be mono or poly-crystalline. It can be intrinsic or doped. The deposited layer could also be of a material different from silicon, as long as it provides the connectivity (allowing for moving electrical charges) while not causing excessive optical loss. It could be, for example, a semiconductor other than silicon.

Tilted-H Waveguide

Figure 8A:
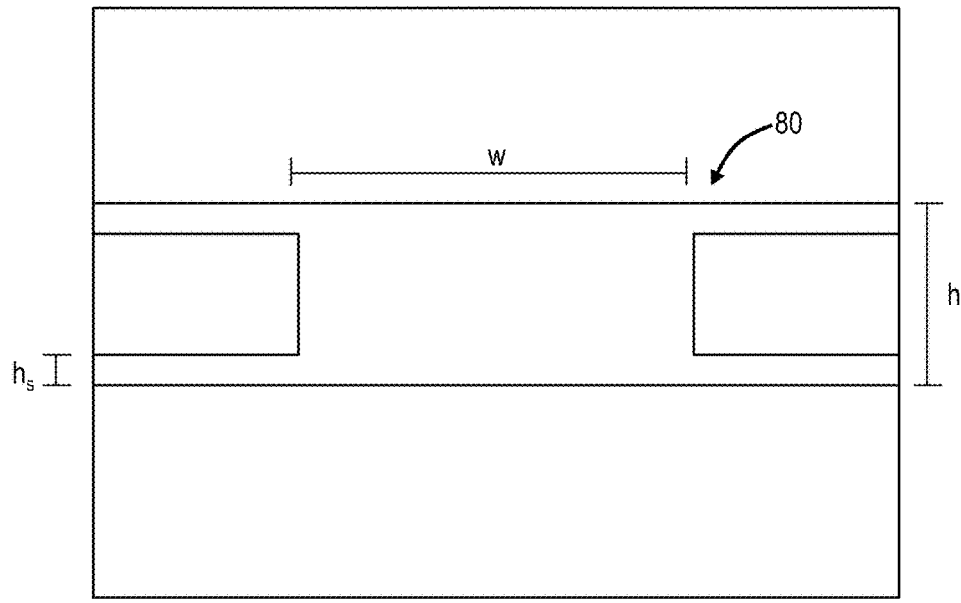
FIGS. 8(a) and 8(b) are diagrams of a tilted-H waveguide with $h_s$=45 nm (total slab height of 90 nm) (FIG. 8(a)) and $h_s$=75 nm (total slab height of 150 nm) (FIG. 8(b)). For both cases, h=220 nm and w=500 nm.
Figure 8B:
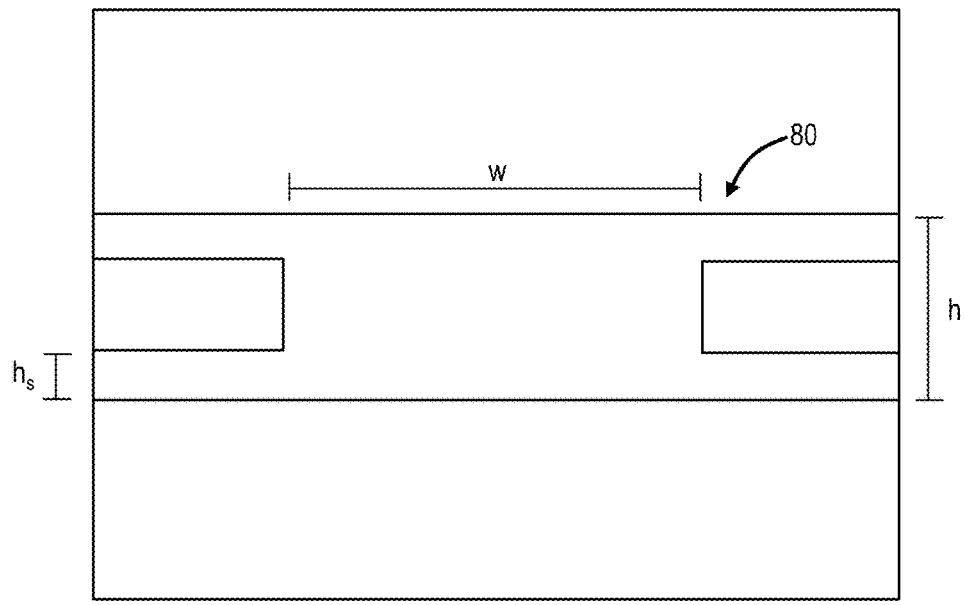
Figure 9A:
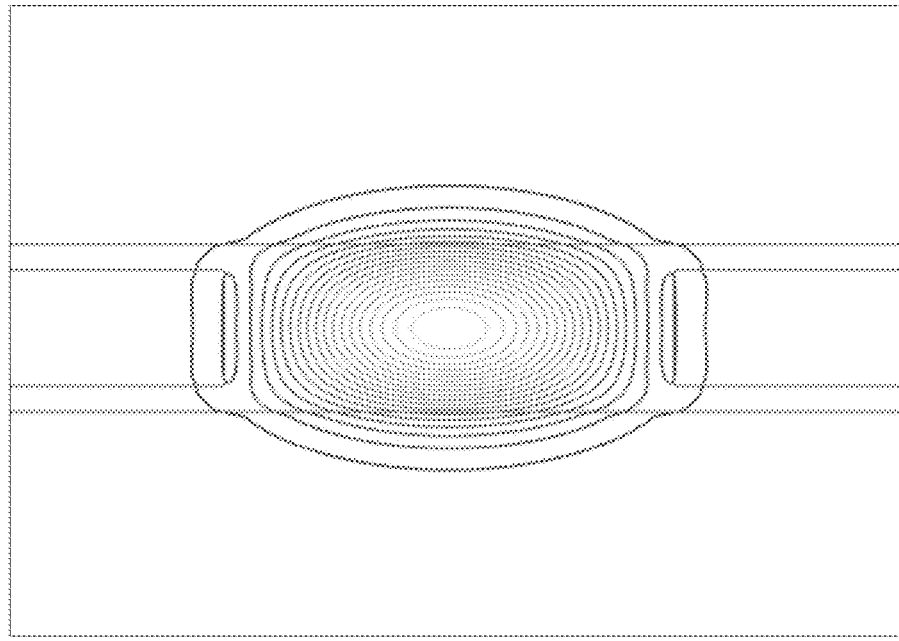
FIGS. 9(a) and 9(b) are Poynting-vector mode profiles for the modified tilted-H waveguide rib of FIGS. 8(a) and 8(b).
Figure 9B:
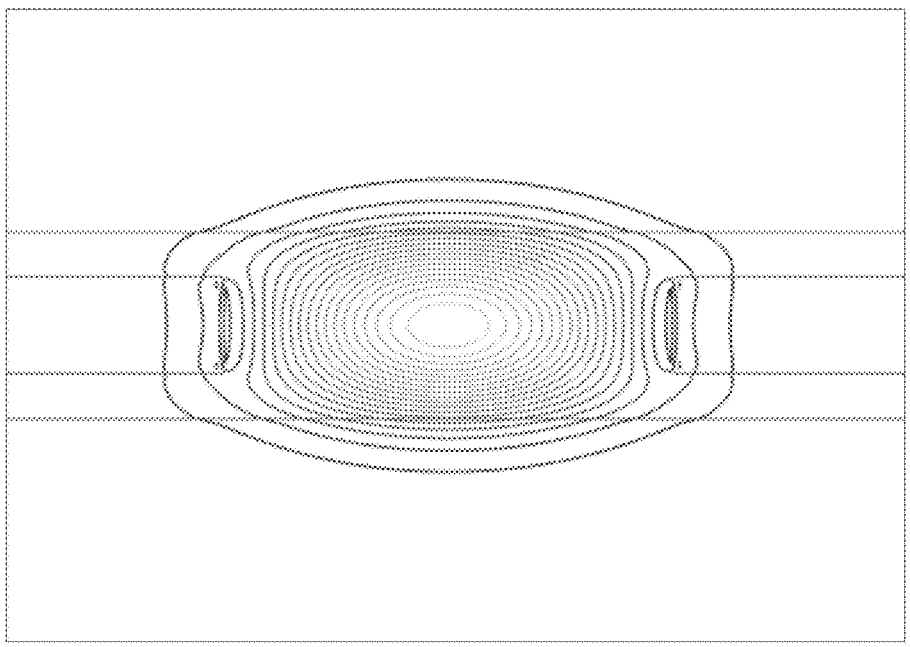

It is possible to reduce even more the optical mode overlap into the slab region by combining the previously proposed top silicon layer together with a conventional rib waveguide to create a titled-H shaped waveguide 80 as shown in FIGS. 8(a) and 8(b). This new tilted-H waveguide 80 has two times more access waveguides. The corresponding Poynting-vector mode profiles are shown in FIGS. 9(a) and 9(b) and the proportion of the Poynting vector in each of the four regions are provided in Table 3 as well as the proportion of more conventional rib waveguide (for comparison purpose). Each access waveguide has a height ($h_s$) and to easily compare the proportion of power inside the various sections of the waveguide discussed in FIG. 1, now region III contains the four slabs, and the total rib height is equal to $2h_s$. The waveguide width (w) and height (h) are defined identically then regular rib waveguides.

TABLE 3

The fraction of the Poynting-vector profile for rib waveguides with slab height of 90 nm and 150 nm respectively and for tilted-H waveguides with a total slab height of 90 nm and 150 nm

| Polarization | Geometry | Waveguide width (nm) | Waveguide central height (nm) | Total slab height (nm) | Portion of the optical mode in section I to IV | | | |
|---|---|---|---|---|---|---|---|---|
| | | | | | I | II | III | IV |
| TE | Rib | 500 | 220 | 90 | 0.334 | 0.387 | 0.038 | 0.241 |
| TE | Rib | 500 | 220 | 150 | 0.24 | 0.381 | 0.157 | 0.222 |
| TE | Tilted-H | 500 | 220 | 90 | 0.402 | 0.413 | 0.013 | 0.172 |
| TE | Tilted-H | 500 | 220 | 150 | 0.381 | 0.436 | 0.031 | 0.152 |

As can be seen from Table 3, the tilted-H waveguide with a total slab of 90 nm (i.e., $h_s$=45 nm) contains significantly less power in the slab region (3.8% versus 1.3%). This can be explained by the fact that having a slab both at the top and at the bottom of the waveguide attract the optical mode toward the center which reduces the overlap of the mode inside the slabs. Since the mode is more located around the center, the effective index contrast is larger, which also increase the confinement of the mode in the core. Since the proportion of the optical mode inside the core (region I+region II) is more localized inside the depletion region (region I) (i.e., the confinement of the mode inside the active region can be defined by $$\Gamma = \frac{P_{dep}}{P_{core}} = \frac{P_I}{P_I + P_2}),$$

the benefit on the $V_\pi$ (region I) is going to be slightly dominating the degradation due to the optical loss (region II), which is also a side benefit of this type of waveguide with $h_s$=45 nm.

It is also of interest to reduce the access resistance in addition to optical losses (or instead of optical loss). As a result, one can increase the doping concentration inside region III. However, the trade-off between optical losses and access resistance becomes less advantageous as the bandwidth and/or the modulation efficiency requirements increases. Another approach is to increase the slab height. However, as can be seen from the first two lines of Table 3, increasing the slab height of typical rib waveguide is significantly detrimental to both the confinement in the region I (which reduces the $V\pi$) and in region III (which increases the optical losses).

Interestingly, one important benefit of the tilted-H waveguides is that an increase in the total slab height (to the value of 150 nm) is not strongly affecting the mode confinements compared to usual rib waveguide with a slab of 90 nm (first line of Table 3). Both region I and region II contain more optical power both in a similar proportion (F remains constant). Thus the relationship between the modulator $V_\pi$ and its optical loss will be similar. So, modulator with identical $V_\pi$ can be obtained from PN junction of line 1 and 4 from Table 3 with similar optical losses, but modulator with PN junctions of line 4 will be shorter (about 15% shorter) which is beneficial for the bandwidth. Furthermore, the fraction of power inside the slabs are similar (3.1% versus 3.8%) again with a small advantage for line 4. However, since the overall thickness of the slab of line 4 is 5/3 larger, the access resistance (for identical dopant concentration) will be reduced by this factor. All of this will provide a significant benefit for the modulator bandwidth.

It should finally be noted that other combinations or variations of the same ideas are of interest, for example:

Providing a top slab that includes a gap and serves at carrying the electric charges combined with a bottom slab without a gap that is passive and serves only at delocalizing the mode still lower;

Providing top and bottom slabs that both include gaps and serve at carrying the electric charges; and The tilted-H waveguides containing a gap in the top slab.

Also, the TM modulator 30 can be combined with the tilted-H waveguide or to the top-rib waveguide ideas.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims

What is claimed is:

1. An optical modulator comprising:
    a rib; and
    a slab interconnected to both sides of the rib;
    wherein the rib is dimensioned relative to the slab to support guiding of a Transverse Magnetic (TM) mode with a main lobe that propagates orthogonal to the slab and with the main lobe substantially excluded from the slab, wherein a height of the rib is about four times a height of the slab.

2. The optical modulator of claim 1, wherein the rib guides wavelengths in an infrared range in the TM mode.

3. The optical modulator of claim 1, wherein a height of the rib is about twice a width of the rib.

4. The optical modulator of claim 1, wherein the slab includes variable doping.

5. The optical modulator of claim 1, wherein the optical modulator is a silicon photonics device.

6. The optical modulator of claim 1, wherein the rib a PN junction, and the slab includes a P doped region adjacent to the rib on a first side and an N doped region adjacent to the rib on a second side, opposite the first side.

7. The optical modulator of claim 6, further comprising a first electrode connected to the P-doped region and a second electrode connected to the N-doped region.

8. An optical modulator comprising:
    a rib; and
    a slab interconnected to both sides of the rib;
    wherein the rib is dimensioned relative to the slab to support guiding of a Transverse Magnetic (TM) mode with a main lobe that propagates orthogonal to the slab and with the main lobe substantially excluded from the slab, wherein a height of the rib is about 400 nm, and a width of the rib is about 200 nm.

9. The optical modulator of claim 8, wherein the rib guides wavelengths in an infrared range in the TM mode.

10. The optical modulator of claim 8, wherein the slab includes variable doping.

11. The optical modulator of claim 8, wherein the optical modulator is a silicon photonics device.

12. The optical modulator of claim 8, wherein the rib a PN junction, and the slab includes a P doped region adjacent to the rib on a first side and an N doped region adjacent to the rib on a second side, opposite the first side.

13. The optical modulator of claim 12, further comprising a first electrode connected to the P-doped region and a second electrode connected to the N-doped region.

14. An optical modulator comprising:
    a rib; and
    a slab interconnected to both sides of the rib;
    wherein the rib is dimensioned relative to the slab to support guiding of a Transverse Magnetic (TM) mode with a main lobe that propagates orthogonal to the slab and with the main lobe substantially excluded from the slab, wherein the rib includes two regions, Region I and Region II, with the TM mode confined in the Region I, wherein the Region II is smaller than the Region I reducing optical losses.

15. The optical modulator of claim 14, wherein the rib guides wavelengths in an infrared range in the TM mode.

16. The optical modulator of claim 14, wherein the slab includes variable doping.

17. The optical modulator of claim 14, wherein the slab includes a Region III where, because of the boundary conditions of the electromagnetic fields, the main lobe is substantially excluded from the slab.

18. The optical modulator of claim 14, wherein the optical modulator is a silicon photonics device.

19. The optical modulator of claim 18, further comprising a first electrode connected to the P-doped region and a second electrode connected to the N-doped region.

20. The optical modulator of claim 14, wherein the rib a PN junction, and the slab includes a P doped region adjacent to the rib on a first side and an N doped region adjacent to the rib on a second side, opposite the first side.

\* \* \* \* \*